United States Patent
Jo

(12)
(10) Patent No.: US 6,222,725 B1
(45) Date of Patent: Apr. 24, 2001

(54) APPARATUS FOR MOUNTING PARTS AND PERSONAL COMPUTER EQUIPPED WITH THE SAME

(75) Inventor: Whan-Haeng Jo, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/078,665

(22) Filed: May 14, 1998

(30) Foreign Application Priority Data

May 15, 1997 (KR) ................................................ 97-18654

(51) Int. Cl.[7] .......................................................... G06F 1/16
(52) U.S. Cl. .......................... 361/683; 361/679; 361/683; 361/686; 312/223.2
(58) Field of Search .................................... 361/679, 680, 361/681, 682, 684, 685, 686, 683

(56) References Cited

U.S. PATENT DOCUMENTS

| | | |
|---|---|---|
| 5,062,016 | 10/1991 | Zupancic . |
| 5,224,024 | 6/1993 | Tu et al. . |
| 5,269,598 | 12/1993 | Liu . |
| 5,278,730 | 1/1994 | Kikinis . |
| 5,331,509 | 7/1994 | Kikinis . |
| 5,363,273 | 11/1994 | Ma . |
| 5,448,495 | 9/1995 | Liu . |
| 5,544,006 * | 8/1996 | Radloff et al. ........................ 361/683 |
| 5,547,272 * | 8/1996 | Paterson et al. .................. 312/223.2 |
| 5,657,202 | 8/1997 | Ma . |
| 5,708,563 | 1/1998 | Cranston, III et al. . |
| 5,715,139 | 2/1998 | Nakajima . |

* cited by examiner

*Primary Examiner*—Leo P. Picard
*Assistant Examiner*—Yean-Hsi Chang
(74) *Attorney, Agent, or Firm*—Robert E. Bushnell, Esq.

(57) ABSTRACT

An apparatus for mounting parts of a personal computer, for example, a speaker, indicator board and option card, to the main frame of a computer. The mounting apparatus includes a main body part detachably mounted to the main frame of a personal computer. A speaker mounting part is arranged in one side portion of the interior of the main body part, while an indicator board mounting part is arranged in the other side portion of the interior of the main body part. Also, an option card support part has a plurality of guide rails arranged parallel with the bottom surface of the main frame of a computer and is formed on an exterior surface of a rear wall of the main body part. Therefore, the above parts are easily mounted to the computer using the mounting apparatus having a single body, thus effectively increasing the usable space defined in the main frame of a computer.

18 Claims, 5 Drawing Sheets

APPARATUS FOR MOUNTING PARTS AND PERSONAL COMPUTER EQUIPPED WITH THE SAME

CLAIM OF PRIORITY

This application makes reference to, incorporates the same herein, and claims all benefits accruing under 35 U.S.C. § 119 from an application entitled Apparatus For Mounting Parts And Personal Computer Equipped With The Same earlier filed in the Korean Industrial Property Office on May 15, 1997, and there duly assigned Serial No. 97-18654 by that Office.

FIELD OF THE INVENTION

The present invention relates to, in general, an apparatus for mounting parts to computers and a personal computer equipped with the same and, more particularly, to an apparatus capable of easily and detachably mounting the parts of a computer, for example, a speaker, indicator board and option card, to the main frame of a desktop personal computer using a single body, thus effectively increasing the usable space defined in the main frame of the computer and achieving an improved mounting performance.

DESCRIPTION OF THE RELATED ART

As well known to those skilled in the art, additional option cards may be detachably mounted to a desktop personal computer so as to provide an upgraded function and large capacity to a personal computer.

Recently, auxiliary devices, such as CD-ROM (compact disk read only memory) drives and DVD (digital video disk) drives, have been incorporated in personal computers, in order to output data through a display unit, such as moving picture data and audio data as well as character data. In a desktop personal computer exemplary of contemporary practice in the art, a main body of a personal computer comprises a main frame. Both an option board and a mother board are detachably installed in the main frame. In practice, the mother board, having a circuit part designed for controlling the operation of the computer, is detachably installed to the bottom surface of the main frame. The option board includes a plurality of extended slots, which are designed for allowing a plurality of option cards to be selectively and detachably installed.

In order to mount the option cards to the extended slots of the computer, a support bracket has to be mounted in the main frame at a desired position. That is, since the support bracket correctly guides and supports option cards fitted in the extended slots, the option cards are effectively connected to the extended slots.

In addition, a speaker is detachably mounted to the front wall of the main frame. The mounting of the speaker may be achieved using a separate bracket designed for mounting the speaker. Alternatively, the speaker may be directly mounted to the main frame using screws. An indicator board, designed for allowing a user to recognize the "ON" or "OFF" state of electric power or the operation of a hard disk drive, is detachably installed at the front wall of the main frame using an additional bracket.

However, the above-mentioned desktop personal computer of the exemplary art is problematic in that a plurality of brackets or support members are mounted to the main frame and are required so as to mount desired elements, for example, a speaker, indicator board and option card, to the main frame, thus reducing the usable space defined in the main frame and the production efficiency of component assembly in the desktop personal computer.

U.S. Pat. No. 5,448,495 to Liu entitled Multifunctional Frame Assembly With Fan And Speaker For A Personal Computer discloses a multifunctional frame assembly for personal computer including a multifunctional frame having a speaker-engaged portion and fan-engaged portion, with the speaker-engaged portion having a pair of engaging members which define an opening. It is disclosed that the fan-engaged portion has a surface with an orifice and a pair of stoppers each being provided with a pair of engaged hooks extending longitudinally and a pair of ribs on an inner wall of the stopper. It is disclosed that a speaker is clamped between engaging members and in alignment with the opening. A ventilating fan with a plurality of holes at the corner region thereof is installed between the ribs and in alignment with the orifice. It is disclosed that a chassis of the computer having an end plate is provided with engaged holes corresponding to the engaged hooks of the stoppers, wherein the frame can be positioned by engaging the engaged hooks with the corresponding engaged holes on the end plate. It is further disclosed that a rear surface of the frame is provided with at least a pair of guiding blocks, each pair of guiding blocks defining a slot therebetween so as to provide auxiliary support for interface cards. It is also disclosed that while the interface cards are inserted onto the motherboard, one end of each interface card is inserted into a slot defined by a pair of guiding blocks.

U.S. Pat. No. 5,062,016 to Zupancic entitled Set of Structural Brackets That Allow Electronic/Electrical Assemblies to Be Mounted Within A Computer Enclosure, discloses a method that allows a disk-drive/controller card mounting bracket and a slotted hang bracket to increase the overall power and efficiency of a computer, whereby the bracket is used to mount a 3.5-inch Winchester drive and its controller interface card to form a complete assembly. It is disclosed that the bracket allows one or more circuit card assemblies or electrical equipment, such as a cooling fan or disk drive to be mounted in a cantilever fashion within a computer.

U.S. Pat. No. 5,224,024 to Tu et al. entitled Retaining Frame For Components Of A Personal Computer, discloses a retaining frame for components of a personal computer having a horizontal portion, with a first section and a second section connected together, and a vertical portion attached substantially perpendicular to the first and second sections. It is disclosed that the first section is adapted to secure a disk drive holder and has at least one leg extending downward to support the retaining frame, with the second section being adapted to secure a power supply, and having at least one leg extending downward to support the retaining frame. It is disclosed that the vertical portion includes a speaker seat and a ventilation fan seat at a central location near the first section, and a speaker securing rib and fan securing device, respectively, for fastening a speaker and a ventilation fan. It is disclosed that the retaining frame with a disk drive holder, power supply, speaker and ventilation fan mounted thereon is disposed on a lower portion of a computer case, and secured inside the case by a vertical force exerted on the retaining frame by an upper portion of the computer case.

U.S. Pat. No. 5,269,598 to Liu entitled Personal Computer Component Support Structure, discloses a personal computer component support structure having a base casing having a front plate and a back plate with a main frame secured therebetween. It is disclosed that the main frame comprises a front portion defining therein a two-staged interior space for respectively receiving a 5¼ inch floppy disk drive and a 3½ inch floppy disk drive and a rear portion defining therein a second interior space for receiving at least one hard disk drive. It is disclosed that a holder member for supporting a ventilation fan and a speaker is secured on an inside surface of the front plate of the base casing.

U.S. Pat. No. 5,278,730 to Kikinis entitled Modular Notebook Computer Having A Planar Array Of Module Bays and U.S. Pat. No. 5,331,509 to Kikinis entitled Modular Notebook Computer Having A Planar Array Of Module Bays And A Pivotally Attached Flat-Panel Display, disclose a modular notebook computer having a framework with module bays for receiving CPU modules, power modules, and peripheral function modules such as floppy and hard disk drives. It is disclosed that the framework has a built-in compressed bus and a variety of function modules which can be plugged into any one of the module bays, with the function modules including, but not limited to, CPU, power, floppy disk, hard disk, RAM memory, LAN communication, modem, FAX communication, and data acquisition.

U.S. Pat. No. 5,363,273 to Ma entitled Computer System With Removable Floppy Disk Drive And Expansion Slot Assembly Mounted Flush In One Corner, discloses a computer system including a floppy disk drive and expansion slot assembly detachably fastened to a recessed hole on a mainframe. It is disclosed that the floppy disk drive and expansion slot assembly has a side rail engaged into a mounting groove on one vertical side wall of the recessed hole of the mainframe, with two connectors electrically and respectively connected to two respective connectors on the mainframe, and a slot for inserting a floppy disk or an expansion card. It is disclosed that the mainframe has a mounting board fitted into a bottom recessed hole on the floppy disk drive and expansion slot assembly, and two bolt controlled spring latches respectively engaged into respective lock holes on the floppy disk drive and expansion slot assembly to hold it in position.

U.S. Pat. No. 5,657,202 to Ma entitled Combination Of Computer Mainframe Housing, Sound Producing Unit, And Mainframe Unit, discloses a combination of computer mainframe housing, sound producing unit, and mainframe unit, including a housing separated into a front sound chamber and a rear receiving chamber by a vertical partition board, a sound producing unit mounted inside the rear receiving chamber which includes a woofer mounted in a hole on the vertical partition board facing the sound chamber. It is disclosed that a sound producing circuit board is fixed to the back panel of the housing and connected to the woofer by an electric wire, and a sound tube having one end fastened to a hole on the back panel of the housing and an opposite end facing the vertical partition board, and a mainframe unit mounted inside the rear receiving chamber of the housing which includes a mother board having a plurality of expansion card slots, and a plurality of expansion cards respectively mounted in the expansion card slots.

U.S. Pat. No. 5,708,563 to Cranston, III et al. entitled Computer With Modular Removable Card Cage, discloses a computer including a main enclosure for housing a plurality of computer components with a subenclosure or card cage for housing a planar circuit board, including a CPU, and at least one accessory board which may be removably secured within the main enclosure, wherein the subenclosure, planar circuit board, and accessory circuit board can be selectively removed from the main enclosure as a unit. It is disclosed that a connection device is provided to releasably electrically connect at least the planar circuit board to one of the computer components housed within the main enclosure.

U.S. Pat. No. 5,715,139 to Nakajima entitled Portable Electric Apparatus Having A Frame Supporting Functional Components, And Method Of Assembling The Portable Electronic Apparatus, discloses a portable electronic apparatus having a housing and a frame incorporated within the housing. It is disclosed that a lower half of the housing has a bottom wall and first wall extending upwardly from the bottom wall, with the first wall defining a first receptacle for containing a first functional component in the lower half. It is disclosed that a frame has a second wall opposing the first wall, with the second wall defining a second receptacle for containing a second functional component within the frame. It is disclosed that the second wall further defines a third receptacle for containing a third functional component within the lower half along with the first wall.

SUMMARY OF THE INVENTION

Accordingly, the present invention has been made with the above problems occurring in the exemplary art in mind. Therefore an object of the present invention is to provide a mounting apparatus capable of easily and detachably mounting parts of a computer, for example, a speaker, indicator board and option card, to the main frame of a desktop personal computer using a single body, thus effectively increasing the usable space defined in the main frame of the computer and achieving an improved mounting performance.

Another object of the present invention is to provide a desktop personal computer having a mounting apparatus capable of easily and detachably mounting parts of a computer to the main frame of the computer.

In order to accomplish the above and other objects of the present invention, the present invention provides an apparatus for mounting parts of a personal computer, including a main body part detachably mounted to a main frame of a personal computer and having an opening at the front portion, a speaker mounting part arranged in one side portion of the interior of the main body part, an indicator board mounting part arranged in the other side portion of the interior of the main body part, and an option card support part arranged on an exterior surface of rear wall of the main body part.

The main body part, generally having an open box shape, includes at least one protrusion extending downwardly from the front end of a lower wall of the main body part so as to engage in an engagement slot located in the main frame, and at least one hook extending from the front end of an upper wall of the main body part at a position opposite to the protrusion in order to engage in a hook slot located in the main frame.

The speaker mounting part, having a size and depth determined in accordance with a size of a speaker to be received therein, includes an aperture formed in a rear wall of the main body part so as to introduce electric or signal lines for the speaker, a protrusion preferably having a cylindrical shape, and preferably centrally formed on an inner surface of the rear wall of the main body part at a desired level so as to support a rear portion of the received speaker; and at least a pair of holding members extending from an inner surface of the rear wall of the main body part so as to be vertically or laterally aligned with the cylindrical protrusion.

The indicator board mounting part, having a size and depth determined in accordance with a size of an indicator board to be received therein, includes an aperture formed in at least one of a bottom portion of the indicator board mounting part and a bottom wall of the main body part so as to introduce electric or signal lines for the indicator board, and a support member integrally formed to on the main body part within the indicator board mounting part so as to elastically support the installed indicator board.

The option card support part of the apparatus for mounting parts of a personal computer includes a plurality of guide rails arranged on an exterior surface of the rear wall of the main body part aligned parallel with a bottom surface of a main frame of the computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
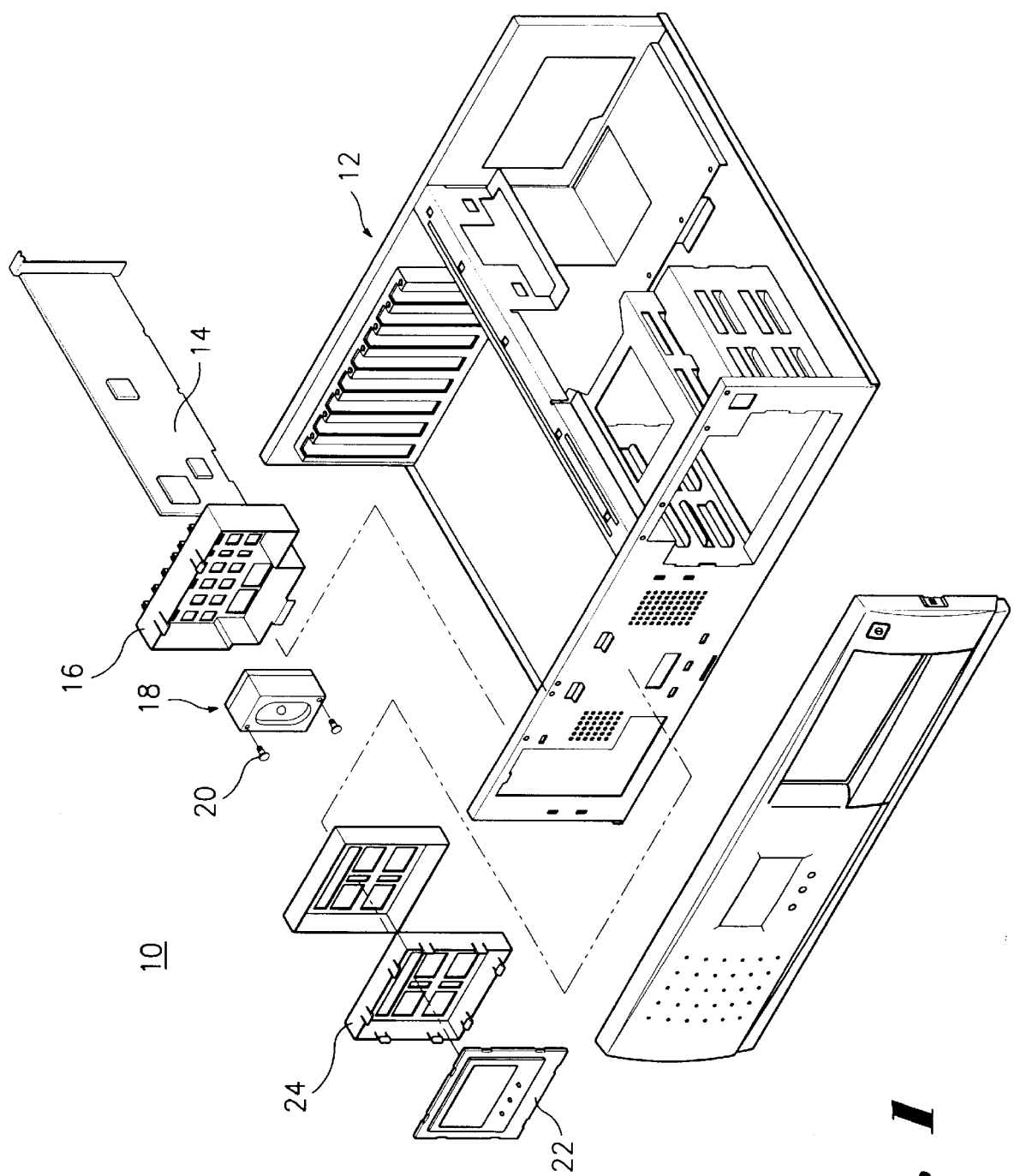
FIG. 1 is an exploded perspective view of a desktop personal computer with an apparatus for mounting parts exemplary of contemporary practice in the art.

FIG. 1 is an exploded perspective view of a main body of a desktop personal computer exemplary of contemporary practice in the art. As shown in the drawing FIG. 1, such a main body 10 of a personal computer comprises a main frame 12. Both an option board and a mother board are detachably installed in the main frame 12. In practice, the mother board, having a circuit part designed for controlling the operation of the computer, is detachably installed to the bottom surface of the main frame 12. The option board includes a plurality of extended slots, which are designed for allowing a plurality of option cards 14 to be selectively and detachably installed.

In order to mount the option cards 14 to the extended slots of the computer, a support bracket 16 has to be mounted in the main frame 12 at a desired position. That is, since the support bracket 16 correctly guides and supports option cards 14 fitted in the extended slots, the option cards 14 are effectively connected to the extended slots.

In addition, a speaker 18 is detachably mounted to the front wall of the main frame 12. The mounting of the speaker 18 may be achieved using a separate bracket designed for mounting the speaker 18. Alternatively, the speaker 18 may be directly mounted to the main frame 12 using screws 20.

An indicator board 22, designed for allowing a user to recognize the "ON" or "OFF" state of electric power or the operation of a hard disk drive, is detachably installed at the front wall of the main frame 12 using an additional bracket 24.

Figure 2:
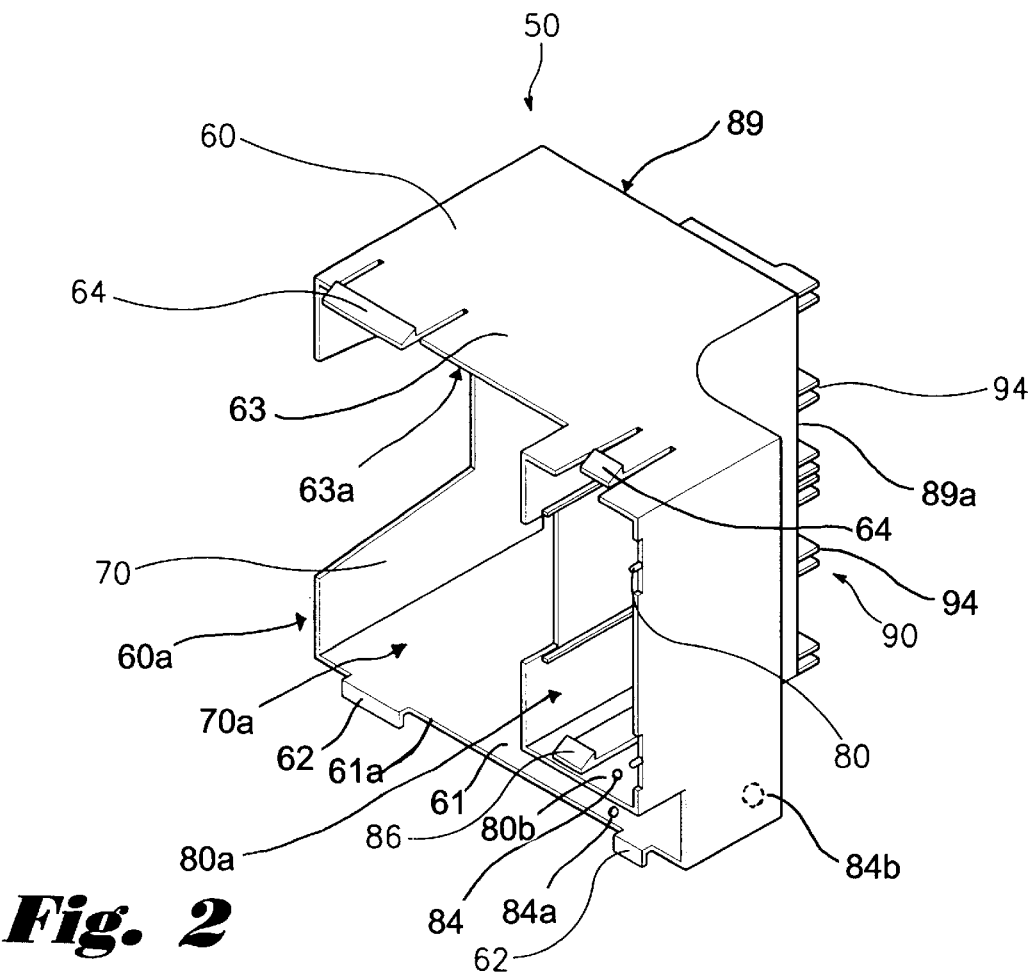
FIG. 2 is a perspective view illustrating an embodiment an apparatus for mounting parts of a personal computer in accordance with the present invention.
Figure 3:
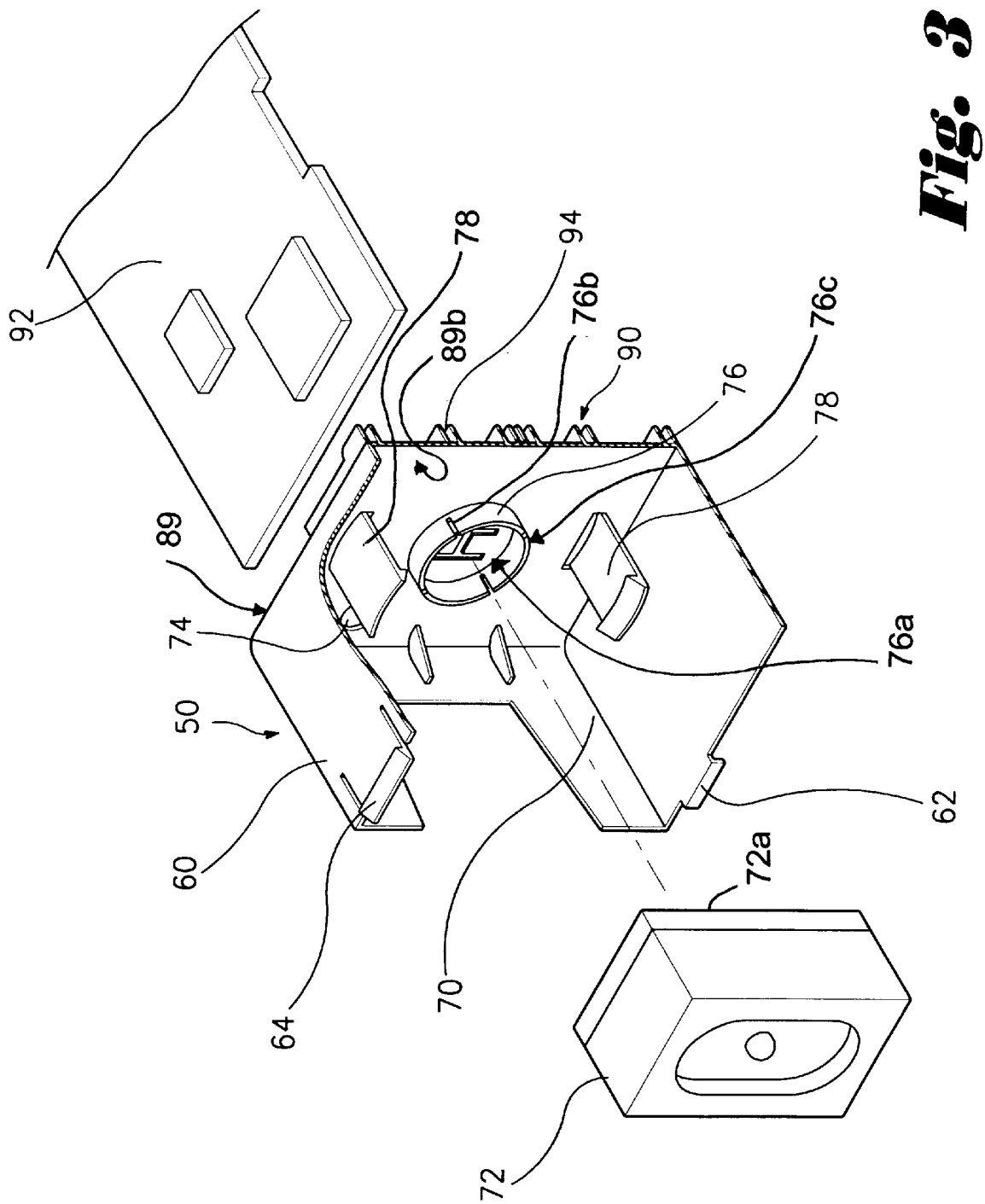
FIG. 3 is an exploded perspective view of an embodiment of an apparatus for mounting parts of a personal computer illustrating mounting a speaker according to the present invention.
Figure 4:
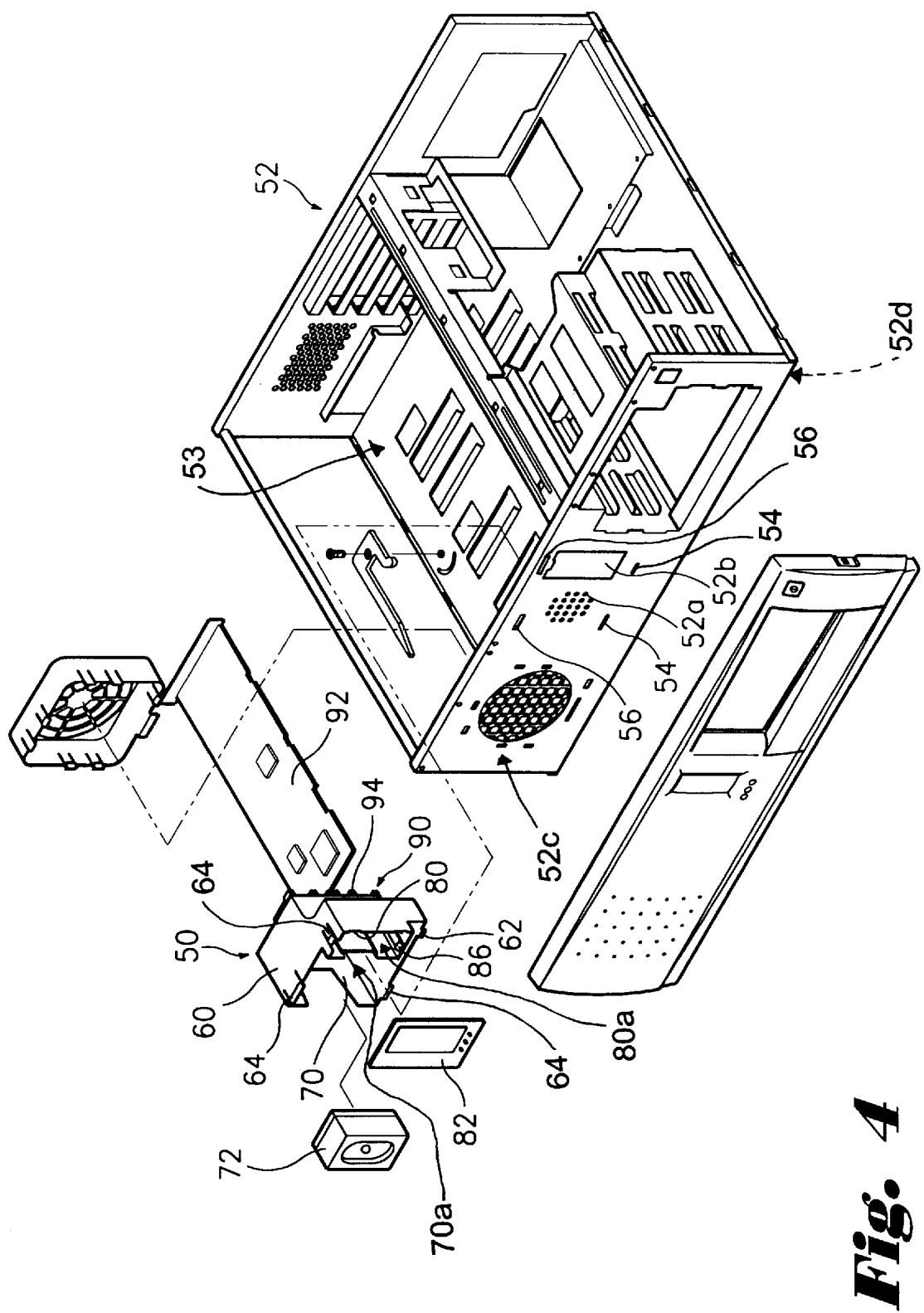
FIG. 4 is an exploded perspective view of a desktop personal computer with an embodiment of an apparatus for mounting parts of a personal computer in accordance with the present invention.

FIGS. 2 through 4 are views illustrating the construction of an apparatus for mounting parts of a computer in accordance with the preferred embodiments of the present invention. As shown in the drawing FIGS. 2–4, the apparatus 50 comprises a box-shaped main body part 60 having a plurality of portions for mounting parts, such as, a speaker mounting part 70, an indicator board mounting part 80 and an option card support part 90. That is, the main body part 60 preferably opens at the front portion 60a thereof and is detachably mounted to a main frame 52 (see FIG. 4). The main body part 60 is preferably formed as a single or unitary body. The speaker mounting part 70 is arranged in one side portion 70a of the interior of the main body part 60, while the indicator board mounting part 80 is arranged in the other side portion 80a of the interior of the main body part 60. The option card support part 90 is formed on an exterior surface 89a of the rear wall 89 of the main body part 60.

A plurality of laterally spaced protrusions 62 (in the illustrated embodiment, two protrusions) extend downwardly from the front end 61a of the lower or bottom wall 61 of the main body part 60 so as to engage with desired portions of the main frame 52. Also, a plurality of laterally spaced hooks 64 (in the illustrated embodiment, two hooks) extend from the front end 63a of the upper wall 63 of the main body part 60 at desired positions opposite to the protrusions 62, respectively.

The speaker mounting part 70 of the apparatus 50 has a size, depth and dimensions determined in accordance with the size of a speaker 72 to be received therein as shown in FIG. 3. In addition, an aperture 74, designed for introducing electric or signal lines, is formed in the rear wall 89 of the main body part 60.

Figure 3A:
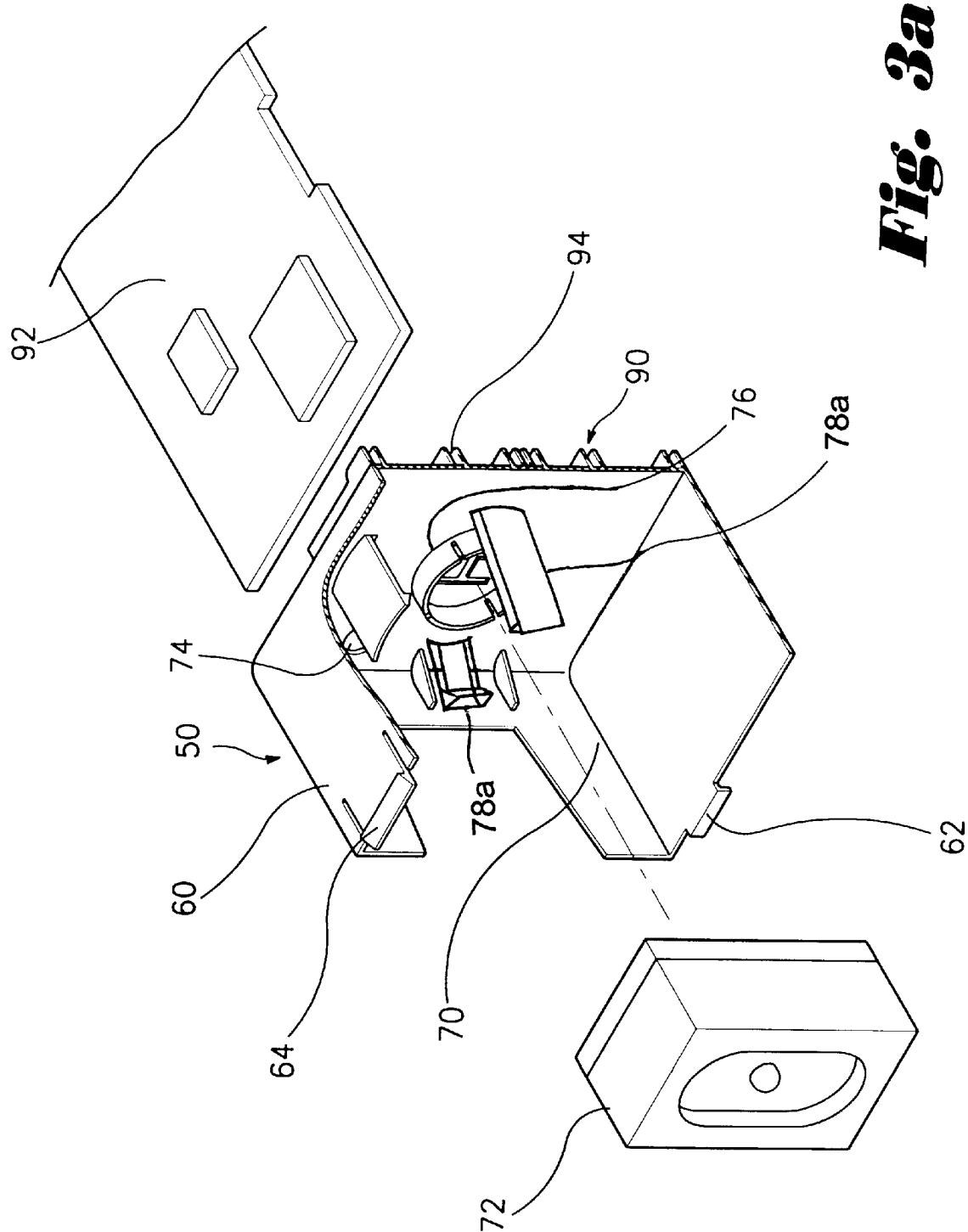
FIG. 3a is an exploded perspective view of an another embodiment of an apparatus for mounting parts of a personal computer illustrating mounting of a speaker according to the present invention.

A protrusion 76, preferably having a cylindrical shape, is preferably centrally formed on the inner surface 89b of the rear wall 89 of the main body part 60 at a desired level and supports and engages with rear wall or rear portion 72a of speaker 70. In addition, a pair of holding members 78 extend from the inner surface 89b of the rear wall 89 of the main body part 60 above and beneath the protrusion 76, respectively, in such a manner that they are vertically aligned with the cylindrical protrusion 76. Thus, when the speaker 72 is mounted in the speaker mounting part 70, the holding members 78 firmly hold the top and bottom portions of the speaker 72, while the rear wall or rear portion 72a of the installed speaker 72 is also supported by the protrusion 76. Also, FIG. 3a illustrates a pair of holding members 78a laterally aligned with the cylindrical protrusion 76 to firmly hold the speaker 72.

In addition, a central area 76a is defined by the cylindrical protrusion 76, while a plurality of circumferentially spaced slits 76b are formed in the protrusion 76. That is, the cylindrical protrusion 76 is divided into arc shaped segments 76c of a desired angle as shown in FIG. 3. Although the holding members 78 are vertically aligned with each other in the illustrated case, they can be laterally aligned with each other as in FIG. 3a.

Referring to FIGS. 2 and 4, the indicator board mounting part 80 of the apparatus 50 has a size, depth and dimensions determined in accordance with the size of an indicator board 82 to be received therein (FIG. 4). In addition, an aperture 84, designed for introducing electric or signal lines, is preferably formed in a bottom portion 80b of indicator board mounting part 80, preferably I -T in conjunction with an aperture 84a in the lower or bottom wall 61 of the main body part 60 or in conjunction with an aperture 84b in rear wall 89 of main body part 60. Also, a support member 86 is preferably integrally formed on and extends from the rear wall 89 of the main body part 60, preferably within the indicator board mounting part 80, so as to elastically support the mounted indicator board 82.

The option card support part 90 of the apparatus 50 includes a plurality of guide rails 94, which are parallel with the bottom surface 52d of the main frame 52 (FIGS. 2–5). Thus, option cards 92 (FIGS. 3–4) are easily guided and supported by the guide rails 94 while they are inserted into the option card support part 90.

FIG. 4 illustrates a desktop personal computer with the above mounting apparatus 50 in an embodiment of the present invention. As shown in FIG. 4, such a personal computer comprises a main frame 52. In addition, speaker 72 is mounted in the one side portion 70a in speaker mounting part 70 to the front wall 52c of the main frame 52, while indicator board 82 is also mounted in the other side portion 80a in the indicator board mounting part 80 to front wall 52c of the main frame 52 so as to allow a user to recognize the "ON" or "OFF" state of electric power or the operation of a hard disk drive, for example. A mother board 53 has a circuit part, designed for controlling the operation of a computer, and is detachably mounted to the bottom surface 52d of the main frame 52.

A plurality of sound emitting apertures 52a are formed in the front wall 52c of the main frame 52 at a position where the speaker 72 is disposed, so the sound from the speaker 72 is easily emitted through the sound emitting apertures 52a. Also, a window aperture 52b is formed in the front wall 52c of the main frame 52 in the vicinity of the sound emitting apertures 52a in order to expose the indicator board 82.

In addition, two engagement slots 54 are respectively formed beneath the sound emitting apertures 52a and the window aperture 52b, respectively. The protrusions 62 of the main body part 60 of the apparatus 50 are engaged in the engagement slots 54, respectively. Also, two hook slots 56 are formed above the engagement slots 54 in such a manner that the hooks 64 of the main body part 60 are engaged in the hook slots 56.

The mounting method of the speaker 72, the indicator board 82 and the option card 92 using the mounting apparatus according to the present invention is described below with reference to FIGS. 3 to 5.

Figure 5:
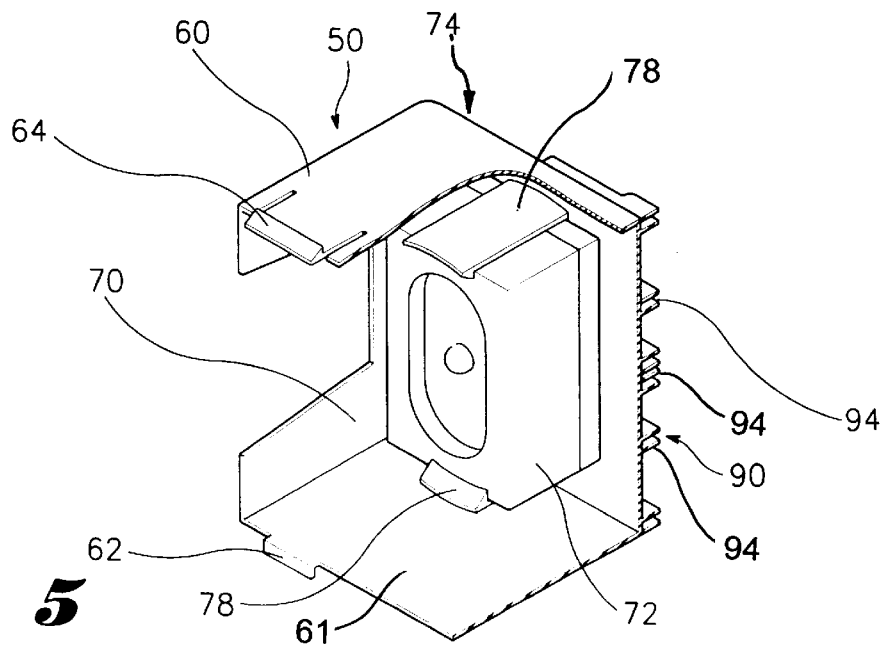
FIG. 5 is a perspective view illustrating an embodiment of an apparatus for mounting parts of a personal computer illustrating a mounted part, such as a speaker, used for a personal computer in accordance with the present invention.

As shown in FIGS. 3 to 5, when the speaker 72 is mounted in speaker mounting part 70 for mounting to the main frame 52 at a desired position, it is first forcibly inserted into the speaker mounting part 70 of the main body part 60. At this time, the rear portion 72a of the speaker 72 is supported by the protrusion 76 of the main body part 60, while both the top and bottom portions of the speaker 72 are firmly held by the holding members 78. Thus, the speaker 72 is mounted in a snap-on manner. That is, when the speaker 72 is forcibly pushed into the speaker mounting part 70, the holding members 78 are slightly widened at their free ends by the pushing force applied to the speaker 72. When the speaker 72 is completely inserted into the speaker mounting part 70, the free ends of the holding members 78 return to their original position. Therefore, the speaker 72 is easily mounted to the speaker mounting part 70 by the holding members 78. Similarly, speaker 72 can be mounted to speaker mounting part 70 by the holding members 78a (FIG. 3a).

Thereafter, the speaker 72 is connected to electric or signal lines (not shown) passing through the aperture 74 of the main body part 60. As a result, the speaker 72 is completely mounted to the apparatus 50.

When the indicator board 82 is mounted in indicator mounting part 80 for mounting to the main frame 52 at a desired position, it is first forcibly inserted into the indicator board mounting part 80 of the main body part 60. At this time, the bottom portion of the indicator board 82 is firmly held by the support member 86 of the apparatus 50. Thus, the indicator board 82 is mounted in a snap-on manner. That is, when the indicator board 82 is forcibly pushed into the indicator board mounting part 80, the support member 86 is slightly widened at its free end by the pushing force applied to the indicator board 82. When the indicator board 82 is completely inserted into indicator board mounting part 80, the free end of the support member 86 returns to its original position. Therefore, the indicator board 82 is firmly mounted to the indicator board mounting part 80 by the support member 86.

Thereafter, the indicator board 82 is connected to the electric or signal lines passing through at least one of the aperture 84 in bottom portion 80b of indicator board mounting part 80 and aperture 84a or 84b in the main body part 60. As a result, the indicator board 82 is completely mounted to the apparatus 50.

When the apparatus 50 with both the speaker 72 and indicator board 82 is mounted to the main frame 52 of the personal computer, the protrusions 62 of the main body part 60 are primarily engaged in the engagement slots 54 of the main frame 52, respectively. Thereafter, the hooks 64 of the main body part 60 are also engaged in the hook slots 56 of the main frame 52. Therefore, the main body part 60 of the apparatus 50 is completely installed in the main frame 52.

In addition, when an option card 92 is to be connected to the computer, such as in order to upgrade the computer, with the mounting apparatus 50, it is primarily inserted into the associated guide rail 94 of the option card support part 90. At this time, the inserted option card 92 is guided and supported by the guide rail 94. As a result, the option card 90 is easily connected to an extended slot of a computer.

Furthermore, when the above parts, for example, the speaker 72, indicator board 82 and option card 92, are removed from the computer, this removal is carried out in a manner reverse to the above-mentioned mounting method.

As mentioned above, the apparatus of the present invention has a configuration capable of easily and detachably mounting parts of a computer, for example, a speaker, indicator board and option card, to the main frame of a desktop personal computer, thus effectively increasing production efficiency in component assembly and improved mounting performance.

Furthermore, the above parts are easily mounted to the computer using the mounting apparatus comprised of a single or unitary body, thus effectively increasing the usable space defined in the main frame of a computer.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An apparatus for mounting parts of a personal computer, comprising:
   a main body part, said main body part being detachably mounted to a main frame of said personal computer;
   a speaker mounting part for mountin2 a speaker for said personal computer said speaker mounting part arranged in one side portion of an interior portion of said main body part, said speaker mounting part comprising:
      an aperture formed in a rear wall of said main body part so as to introduce at least one of electric and signal lines for said speaker;
      a speaker engaging protrusion formed on an inner surface of said rear wall of said
      main body part for engaging, a rear portion of said speaker; and
      at least one pair of holding members for engaging said speaker, said at least one pair of holding members extending from said inner surface of said rear wall of said main body part;
   an indicator board mounting part for mounting an indicator board for said personal computer, said indicator board mounting part arranged in another side portion of said interior portion of said main body part; and
   an option card support part for supporting at least one option card for said personal computer, said option card support part formed on an exterior portion of said rear wall of said main body part.

2. The apparatus as claimed in claim 1, further comprised of said main body part comprising:
   at least one main frame engaging protrusion extending downwardly from a front end of a lower wall of said main body part so as to engage in a corresponding engagement slot of said main frame of said personal computer; and
   at least one hook extending from a front end of an upper wall of said main body part so as to engage in a corresponding hook slot of said main frame of said personal computer.

3. The apparatus as claimed in claim 1, further comprised of said indicator board mounting part comprising:
   an aperture formed in at least one of a bottom portion of said indicator board mounting part and a bottom portion of said main body part so as to introduce at least one of signal and electric lines for said indicator board; and
   a support member integrally formed on said main body part within said indicator board mounting part so as to elastically support said indicator board.

4. The apparatus as claimed in claim 1, further comprised of said option card support part of said apparatus for mounting parts including a plurality of guide rails arranged parallel with a bottom surface of said main frame of said personal computer.

5. An apparatus for mounting parts of a personal computer, comprising:
   a main body part, said main body part being detachably mounted to a main frame of said personal computer, said main body part comprising:
      at least one main frame engaging protrusion extending downwardly from a front end of a lower wall of said main body part so as to engage in a corresponding engagement slot of said main frame of said personal computer; and
      at least one hook extending from a front end of an upper wall of said main body part so as to engage in a corresponding hook slot of said main frame of said personal computer;
   a speaker mounting part for mounting a speaker for said personal computer, said speaker mounting part arranged in one side portion of an interior portion of said main body part, said speaker mounting part comprising:
      an aperture formed in a rear wall of said main body part so as to introduce at least one of electric and signal lines for said speaker;
      a speaker engaging protrusion formed on an inner surface of said rear wall of said main body part for engaging a rear portion of said speaker; and
      at least one of pair of holding members for engaging said speaker, said at least one pair of holding members extending from said inner surface of the rear wall of said main body part;
   an indicator board mounting part for mounting an indicator board for said personal computer, said indicator board mounting part arranged in another side portion of said interior portion of said main body part, said indicator board mounting part comprising:
      an aperture formed in at east one of a bottom portion of said indicator board mounting part and a bottom portion of said main body part so as to introduce at least one of signal and electric lines for said indicator board; and
      a support member integrally formed on said main body part within said indicator board mounting part so as to elastically support said indicator board; and
   an option card support part for supporting at least one option card for said personal computer, said option card support part formed on an exterior portion of said rear wall of said main body part.

6. The apparatus as claimed in claim 5, further comprised of said main body part having a box-like shape and opening at a front portion of said main body part, and said at least one hook being disposed in opposing relation to a corresponding said at least one main frame engaging protrusion.

7. The apparatus as claimed in claim 6, further comprised of said speaker engaging protrusion having a cylindrical shape and being centrally formed on said inner surface of said rear wall of said main body part and being arranged to support said rear portion of said speaker, and said at least one pair of holding members being aligned with said speaker engaging protrusion.

8. The apparatus as claimed in claim 7, further comprised of said option card support part of said apparatus for mounting parts including a plurality of guide rails arranged parallel with a bottom surface of said main frame of said personal computer.

9. The apparatus as claimed in claim 5, further comprised of said speaker engaging protrusion having a cylindrical shape and being centrally formed on said inner surface of said rear wall of said main body part and being arranged to support said rear portion of said speaker, and said at least one pair of holding members being aligned with said speaker engaging protrusion.

10. The apparatus as claimed in claim 5, further comprised of said option card support part of said apparatus for mounting pairs including a plurality of guide rails arranged parallel with a bottom surface of said main frame of said personal computer.

11. A desktop personal computer, comprising:
    a main frame; and
    an apparatus for mounting parts of said desktop personal computer, said apparatus for mounting parts comprising:

a main body part said main body part being detachably mounted to said main frame of said desktop personal computer;

a speaker mounting part for mounting a speaker for said desktop personal computer. said speaker mounting part arranged in one side portion of an interior portion of said main body part, said speaker mounting part comprising:

an aperture formed in a rear wall of said main body part so as to introduce at least one of electric and signal lines for said speaker;

a speaker engaging protrusion formed on an inner surface of said rear wall of said main body part for engaging a rear portion of said speaker; and at least one pair of holding members for engaging said speaker, said at least one pair of holding members extending from said inner surface of said rear wall of said main body part;

an indicator board mounting part for mounting an indicator board for said desktop personal computer, said indicator board mounting part arranged in another side portion of said interior portion of said main body part; and an option card support part for supporting at least one option card for said desktop personal computer, said option card support part formed on an exterior portion of said rear wall of said main body pall, and wherein said speaker, said indicator board and said at least one option card are detachably mounted to said desktop personal computer using said apparatus for mounting parts comprised of a single body.

12. The desktop personal computer as claimed in claim 11, further comprised of said main body part comprising:

at least one main frame engaging protrusion extending downwardly from a front end of a lower wall of said main body part so as to engage in a corresponding engagement slot of said main frame of said desktop personal computer; and at least one hook extending from a front end of an upper wall of said main body part so as to engage in a corresponding hook slot of said main frame of said desktop personal computer.

13. The desktop personal computer as claimed in claim 11, further comprised of said indicator board mounting part comprising:

an aperture formed in at least one of a bottom portion of said indicator board mounting part and a bottom portion of said main body part so as to introduce at least one of signal and electric lines for said indicator board; and a support member integrally formed on said main body part within said indicator board mounting part so as to elastically support said indicator board.

14. The desktop personal computer as claimed in claim 11, further comprised of said option card support part of said apparatus for mounting parts including a plurality of guide rails arranged parallel with a bottom surface of said main frame of said desktop personal computer.

15. A desktop personal computer, comprising:

a main frame; and an apparatus for mounting parts of said desktop personal computer, said apparatus for mounting parts comprising:

a main body part, said main body part being detachably mounted to said main frame of said desktop personal computer, said main body part comprising:

at least one main frame engaging protrusion extending downwardly from a front end of a lower wall of said main body part so as to engage in a corresponding engagement slot of said main frame of said desktop personal computer; and at least one hook extending from a front end of an upper wall of said main body part so as to engage in a corresponding hook slot of said main frame of said desktop personal computer;

a speaker mounting part f(ir mounting a speaker for said desktop personal computer, said speaker mounting part arranged in one side portion of an interior portion of said main body part, said speaker mounting part comprising:

an aperture formed in a rear wall of said main body part so as to introduce at least one of electric and signal lines for said speaker;

a speaker engaging protrusion formed on an inner surface of said rear wall of said main body part for engaging a rear portion of said speaker; and at least one pair of holding members for engaging said speaker, said at least one pair of holding members extending from said inner surface of said rear wall of said main body part;

an indicator board mounting part for mounting an indicator board for said desktop personal computer, said indicator board mounting part arranged in another side portion of said interior portion of said main body part, said indicator board mounting part comprising:

an aperture formed in at least one of a bottom portion of said indicator board mounting part and a bottom a portion of said main body part so as to introduce at least one of signal and electric lines for said indicator board; and a support member integrally formed on said main body part within said indicator board mounting part so as to elastically support said indicator board; and an option card support part for supporting at least one option card for said desktop personal computer, said option card support part formed on an exterior portion of said rear wall of said main body part, said option card support part of said apparatus for mounting parts including a plurality of guide rails arranged parallel with a bottom surface of said main frame of said desktop personal computer, and said speaker, said indicator board and said at least one option card being detachably mounted to said desktop person 9 computer using said apparatus for mounting parts comprised of a single body.

16. The desktop personal computer as claimed in claim 15, further comprised of said main body pail having a box-like shape and opening at a front portion of said main body pail, and said at least one hook being disposed in opposing relation to a corresponding said at least one main frame engaging protrusion.

17. The desktop personal computer as claimed in claim 16, further comprised of said speaker engaging protrusion having a cylindrical shape and being centrally formed on said inner surface of said rear wall of said main body part and being arranged to support said rear portion of said speaker, and said at least one pair of holding members being aligned with said speaker engaging protrusion.

18. The desktop personal computer as claimed in claim 15, further comprised of said speaker engaging protrusion having a cylindrical shape and being centrally formed on said inner surface of said rear wall of said main body part and arranged to support said rear portion of said speaker, and said at least one pair of holding members being aligned with said speaker engaging protrusion.

* * * * *